United States Patent [19]

Smith

[11] Patent Number: 5,013,134

[45] Date of Patent: May 7, 1991

[54] GHOST-FREE AUTOMOTIVE HEAD-UP DISPLAY EMPLOYING A WEDGED WINDSHIELD

[75] Inventor: Ronald T. Smith, Torrance, Calif.

[73] Assignee: Hughes Aircraft Company, Los Angeles, Calif.

[21] Appl. No.: 413,932

[22] Filed: Sep. 28, 1989

[51] Int. Cl.⁵ .................. G02B 27/10; E04C 2/54
[52] U.S. Cl. ..................... 350/174; 350/276 R; 52/789; 340/705
[58] Field of Search ............ 350/174, 276 R; 52/789; 340/705, 980

[56] References Cited

U.S. PATENT DOCUMENTS

| | | | |
|---|---|---|---|
| 1,834,017 | 12/1931 | Carbonara | 350/276 |
| 2,324,469 | 7/1943 | Brunsoh | 350/276 |
| 2,750,833 | 6/1956 | Gross | 350/174 |
| 3,276,813 | 10/1966 | Shaw | 350/174 |
| 3,723,805 | 3/1973 | Scarpino et al. | 350/174 |

FOREIGN PATENT DOCUMENTS 216692 10/1986 European Pat. Off. ............ 350/174

*Primary Examiner*—Jon W. Henry
*Attorney, Agent, or Firm*—Leonard A. Alkov; W. K. Denson-Low

[57] ABSTRACT

A substantially ghost-free head-up display for a vehicle such as an automobile is disclosed. A head-up display unit projects the image beam toward the vehicle windshield for reflection back toward the viewer's eye. The windshield is slightly tapered so that the reflected images from the outside and inside surfaces of the windshield are reflected at slightly different angles, chosen so that the images substantially overlap at the viewer's eye. Use of a properly selected taper results in substantially ghost-free operation. The taper can be achieved by sandwiching a tapered layer of transparent material such as polyvinylbutyral between two windshield singlets.

16 Claims, 5 Drawing Sheets

(A) STACK SINGLET, PVB, SINGLET (B) CUT AWAY EXCESS PVB (C) WINDSHIELD SANDWICHES (D) AUTOCLAVE CHAMBER

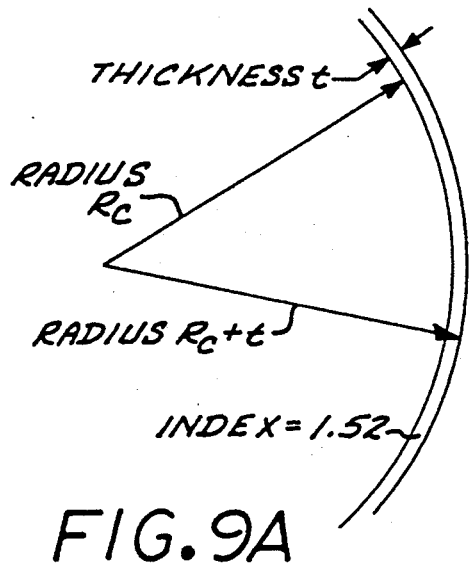
FIG.9A
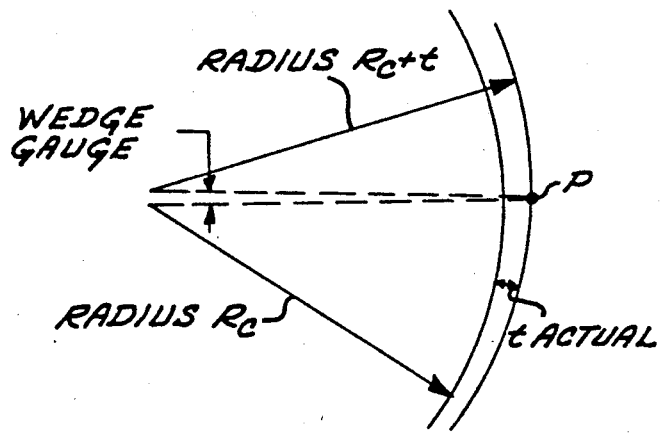
FIG.9B
FIG.10
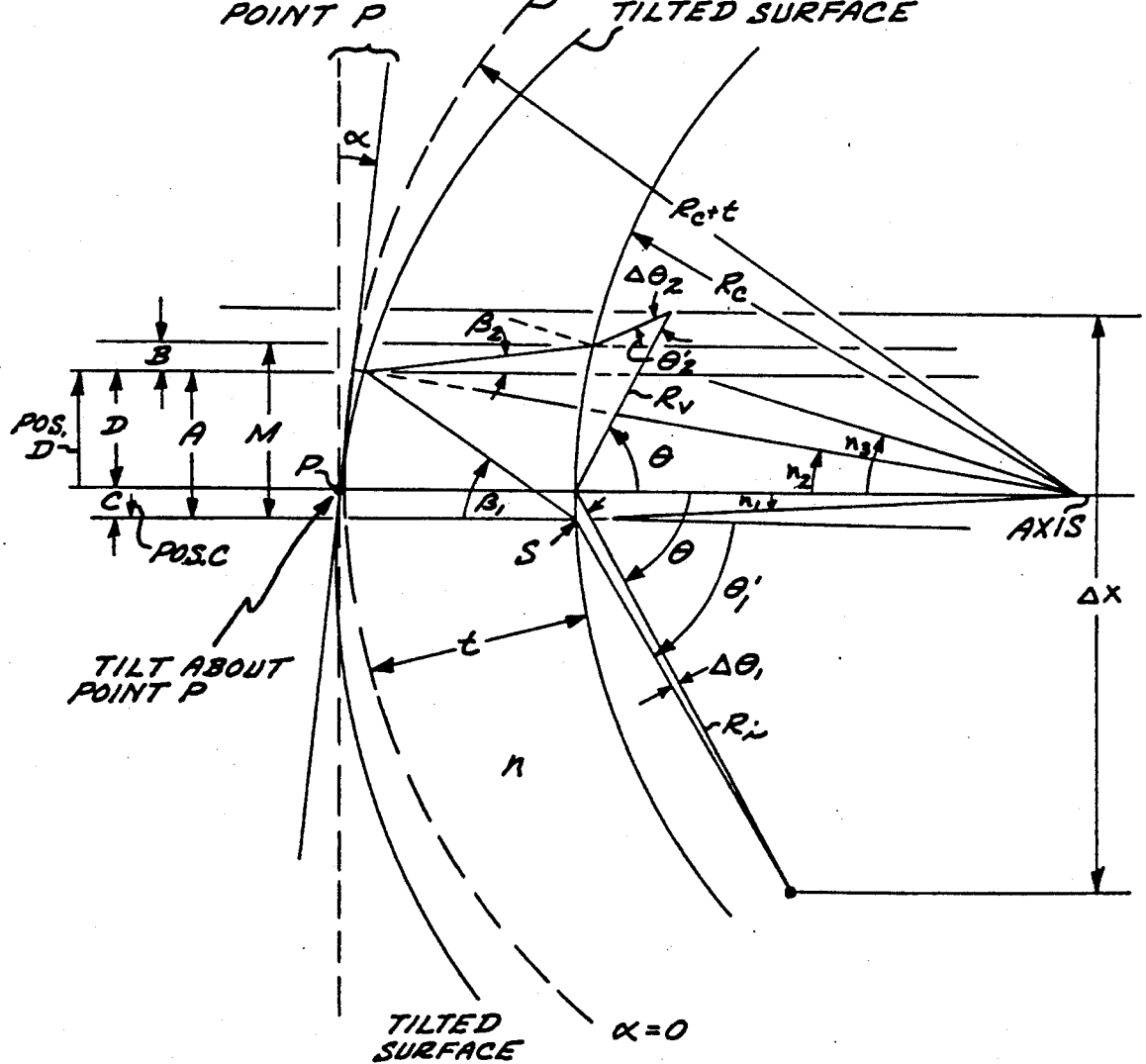

GHOST-FREE AUTOMOTIVE HEAD-UP DISPLAY EMPLOYING A WEDGED WINDSHIELD

BACKGROUND OF THE INVENTION

The present invention relates to head-up displays for automobiles, and more particularly to a display system for displaying substantially ghost-free images.

Head-up holographic instrument displays for vehicles have been used to provide virtual images that appear to be located ahead of the vehicle windshield toward the front of the vehicle. These displays provide the advantage of increased safety since the operator does not have to significantly divert attention from viewing the outside to check the instrument status, and are more readily noticed in the event of the display warning of a malfunction.

An example of a dynamic head-up display, i.e., one wherein the visible image is changeable, is the head-up display recently produced on certain automobiles marketed by General Motors Corporation. This display includes a head-up display unit located on top of the dashboard on the driver's side. The head-up display unit includes an image source, comprising a vacuum fluorescent display, and a curved mirror which projects the image light onto a conventional windshield. The image light reflects off the windshield and toward the driver, who sees a virtual image floating in space beyond the windshield. The curvature of the mirror causes the image to be magnified and projected about six feet beyond the windshield as a virtual image.

Most conventional windshields are made by placing a layer of polyvinylbutyral (PVB) which has a uniform thickness between two windshield singlets, and laminating the sandwiched assembly in a windshield autoclave.

In a conventional automotive head-up display (HUD) where the image source is located away from the windshield, the light from the image source reflects off the windshield toward the viewer, who sees the image floating in space beyond the windshield. If a conventional windshield is used, the viewer sees two separated images, one from the front surface of the windshield and one from the back surface. These "ghost" images interfere greatly with acceptable viewing; furthermore, the individual images themselves may not be bright enough against the ambient background.

Current approaches to reduce the ghost image problem have primarily involved the addition of a zero-degree hologram or dielectric coating on one of the inside windshield singlet surfaces adjacent the layer of PVB. These applications in effect create a third ghost image, but hopefully sufficiently reduce the brightness of the image off the outside surface of the windshield laminate so that when the brightness of the image source is adjusted properly, the ghost image from the outside surface will blend into the background, leaving the other two images. Since the thickness of a singlet is only 70–90 mils compared to the total windshield thickness of 170–210 mils, the ghost image separation of the remaining two images is smaller, and hopefully small enough to yield a substantially overlapped, acceptably viewable image.

Other approaches to reduce ghost images place a p-polarizer in front of the image source, so that the reflection off the hologram or coating is substantially larger than off the glass/air surfaces.

None of these approaches are ideal, and each of them have at least several of the following drawbacks: see-through distortion, see-through discoloration, reflection distortion, low see-through transmission, deviation from the federal transmittance specification for vehicle windshields, relatively high transmission of infrared light, poor PVB adhesion, too much PVB adhesion, and inadequate reduction of the ghost image problem. In addition, these approaches involve the addition of at least one extra component into the windshield, and therefore add to the windshield cost and complexity.

SUMMARY OF THE INVENTION

It would therefore be an advantage to provide a vehicle head-up display which achieves ghost-free operation without the use of a windshield mounted hologram or dielectric coating.

This and other advantages and features are achieved in a vehicle head-up display which includes a head-up display image projection unit for projecting a beam of image light toward the vehicle windshield for reflection toward a predetermined viewing area or view box within the vehicle. In accordance with the invention, the reflecting surfaces of the windshield are non-parallel and disposed at respective angles with respect to the image beam so that the respective images reflected from the surfaces substantially overlap at the view box, providing a substantially ghost-free, head-up display image.

The windshield may be constructed as a laminate structure of first and second windshield singlets sandwiching an intermediate layer of transparent material such as PVB, wherein the intermediate layer is characterized by a taper in its thickness dimension.

BRIEF DESCRIPTION OF THE DRAWINGS

These and other features and advantages of the present invention will become more apparent from the following detailed description of an exemplary embodiment thereof, as illustrated in the accompanying drawings, in which:

FIGS. 9A and 9B are diagrams representing a model of a curved windshield which may be employed in determining the correct windshield taper to be used to eliminate ghost images.

FIG. 10 is a further representation of a curved window cross-section and showing various parameters used in the analysis to determine the correct windshield taper.

DETAILED DESCRIPTION OF THE DISCLOSURE

Figure 1:
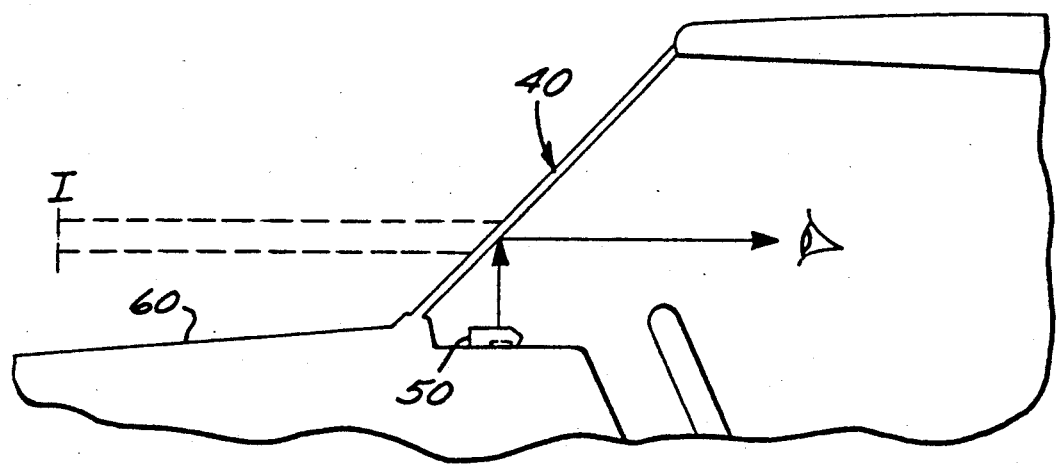
FIG. 1 is a diagramatic view of a vehicle head-up display employing reflection from the vehicle windshield.

In the preferred embodiment of the invention, an automotive HUD unit 50 is located in the dashboard of a vehicle 60. As shown in FIG. 1, the HUD image light reflects off the windshield 40 and into the driver's field of view, so that he sees the image I floating at an image plane in space somewhere beyond the windshield 40.

Figure 2:
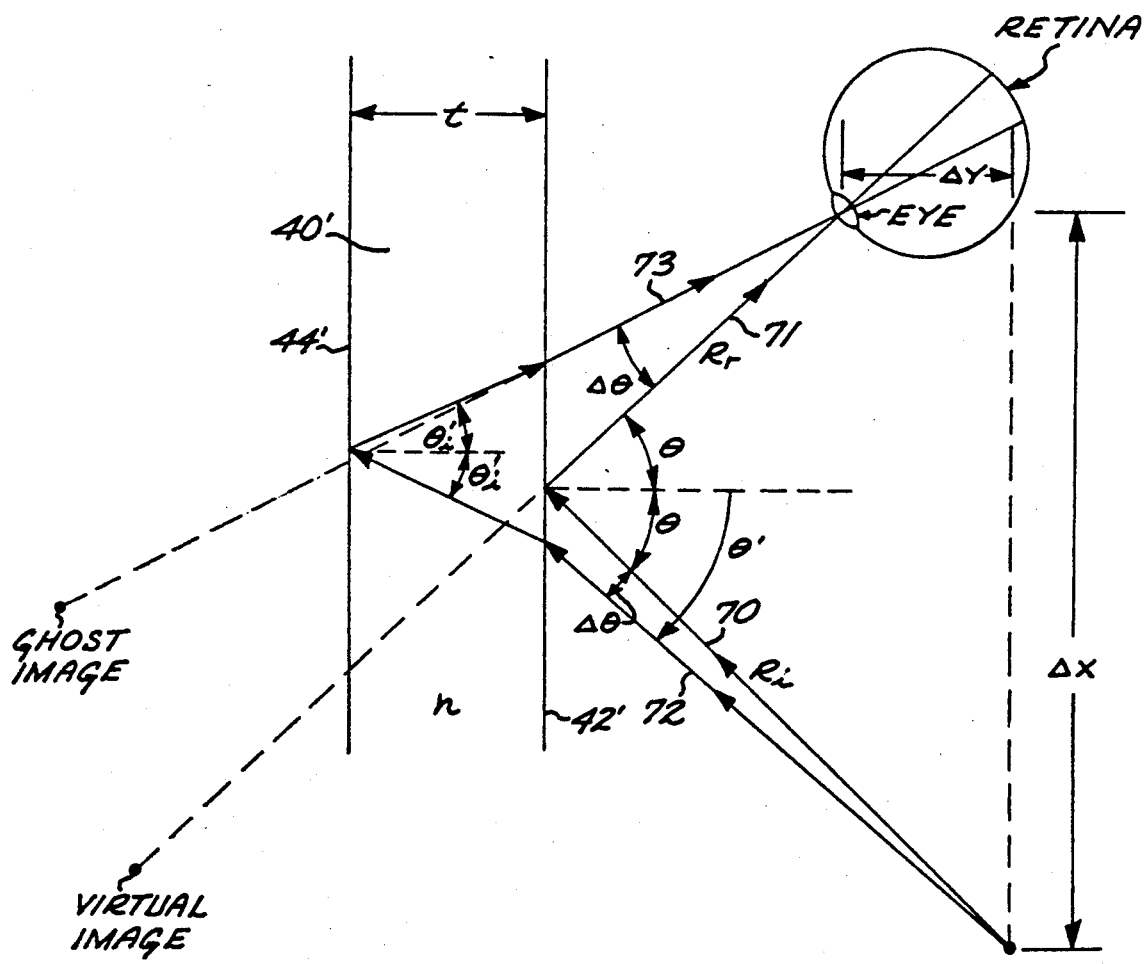
FIG. 2 is a cross-sectional view taken through a conventional vehicle windshield and illustrating the ghost-image problem. This model is simplified by approximating the windshield as a plane parallel plate.

FIG. 2 illustrates the ghost image problem inherent in a system which employs a conventional windshield 40'. As is seen in FIG. 2, the respective image light reflecting off the front and back surfaces of a conventional windshield 40' (surfaces 42' and 44' of FIG. 2) and reaching the viewer's eye appear visually separated in space. Thus, the virtual image (the main image) is created by reflectio of the main central ray 70 from the interior surface 42' of the windshield back into the viewer's. The ghost image is created by the refletion of central ray 72 from the exterior surface of the windshield 40' back into the viewer's eye. This double image is very objectionable and interferes severely with viewability of the display.

It will be apparent to those skilled in the art that during operation, an infinite number of rays emanate from the HUD image source at different angles. Ray 70 represents the central ray from the HUD image source for reflection off the interior windshield surface 42' as ray 71 to the center of the viewer's eye lens. Ray 72 represents the central ray from the HUD image source for reflection off the exterior windshield surface 44' as ray 73 toward the center of the viewer's eye lens. The apparent optical path length between the HUD image source and the interior windshield surface 42' along ray 70 is denoted as $R_i$. The apparent optical path length along ray 71 between the windshield surface 42' and the viewer's eyes is denoted as $R_v$. The angular separation between rays 70 and 72, and between rays 71 and 73 is denoted as $\Delta\theta$. Rays 71 and 73 pass through the center of the viewer's corneal lens onto the retina. Therefore, the angle $\Delta\theta$ between rays 71 and 73 is equal to the angle $\Delta\theta$ of the rays as they are incident on the retina. Thus, the apparent image separation to the viewer is an angle $\Delta\theta$. The angle $\theta$ represents the angle the ray 70 departs from the perpendicular to surface 42', and the angle $\theta' = \theta - \Delta\theta$. The parameter $\Delta X$ represents the distance along a vertical X axis between the HUD image source and the viewer's eye, and $\Delta Y$ represents the distance along a horizontal Y axis between the HUD image source and the viewer's eye. The parameter t represents the windshield thickness. The following equations represent the relationships between the foregoing parameters.

$$\Delta x = (R_i + R_v) \sin \theta = (R_i + R_v) \cos \theta \tan \theta' + (2t) \tan \theta'_i \quad (1)$$

$$n \sin \theta'_i = \sin \theta' \quad (2)$$

Therefore, $$(\sin \theta - \cos \theta \tan \theta')/(\tan \theta'_i) = (2t)/(R_i + R_v) \quad (3)$$

Equations (2) and (3) can be solved for $\Delta\theta$, given the parameter values for a particular application.

The angular separation of the two images increases with increasing windshield thickness (t), decreasing image to windshield distance ($R_i$), decreasing viewer to windshield distance ($R_v$), and is also a function of the viewing angle $\theta$ and the windshield refractive index n. Therefore, possible strategies for reducing the ghost image include reducing the windshield thickness and moving the apparent image position toward infinity. However, any windshield less than 150 mils thick is acoustically too thin and acts like an eardrum, transmitting noises as faint as raindrops hitting the windshield. Placing the image at infinity is unacceptable because there is the danger that the driver will be focusing on the image at infinity and ignoring the car six feet in front of him which he is about to hit. Placing the image approximately at the plane of the front bumper is useful because it not only is far enough away to avoid requiring much eye accommodation by the driver, but it also is a helpful distance cue for cars where the bumper is too low to be visible above the hood. However, the ghost image separation on a conventional windshield having a thickness of 170 mils where the image is located above 6 feet from the viewer is large enough to be unacceptable. For the example shown in FIG. 2, where exemplary parameter values ($R_v = 30$ inches, $R_i = 64.5$ inches, $\theta = 68.8°$, $t = 0.19$ inches and $n = 1.52$) are used, the image separation ($\Delta\theta$) is 0.057°.

Most conventional windshields are made by placing a PVB layer which has uniform thickness between two windshield singlets and laminating the sandwiched assembly in a windshield autoclave. The PVB sheets themselves are typically made by extruding molten PVB through a uniform-width slot. However, on some PVB extruders, the size and wedge of the extrusion slot is adjustable. Therefore, the extrusion slot can be adjusted to create PVB sheets that are slightly wedged, i.e., which are tapered and have a different thickness at the top edge than the bottom edge.

Figure 3:
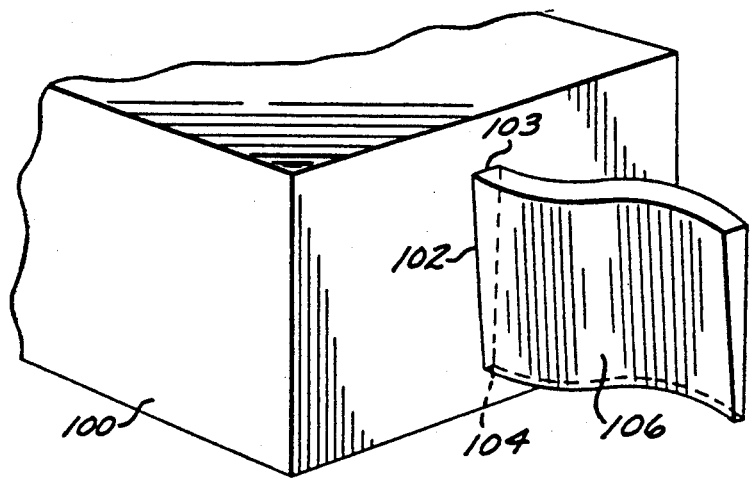
FIG. 3 is a simplified perspective view of an extruder device for extruding molten PVB through a wedge-shaped slot to form a wedge layer.

FIG. 3 is a simplified illustration of a PVB extruder 100 for extruding PVB in a molten state through a wedged slot 102 to form a wedged sheet of extruded PVB 106. The degree of wedge is exaggerated in FIG. 3, with the slot width dimension at the top 103 of the slot 102 being greater than the width dimension at the bottom 104. The extruder 100, except for the wedge of the slot, is conventional.

Figure 4:
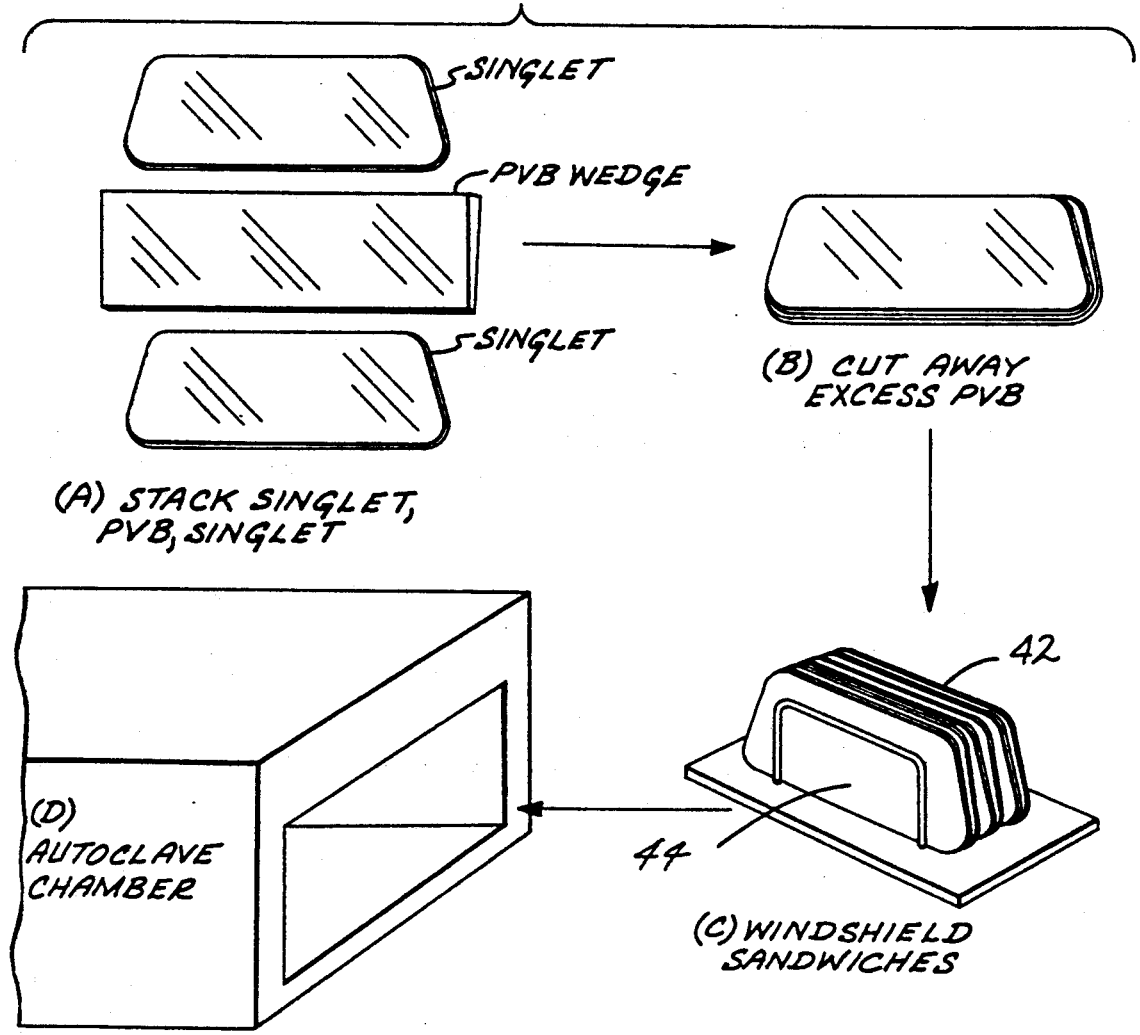
FIG. 4 is a simplified view of the process, including a windshield autoclave, for laminating the wedged PVB layer between two windshield singlets.
Figure 5:
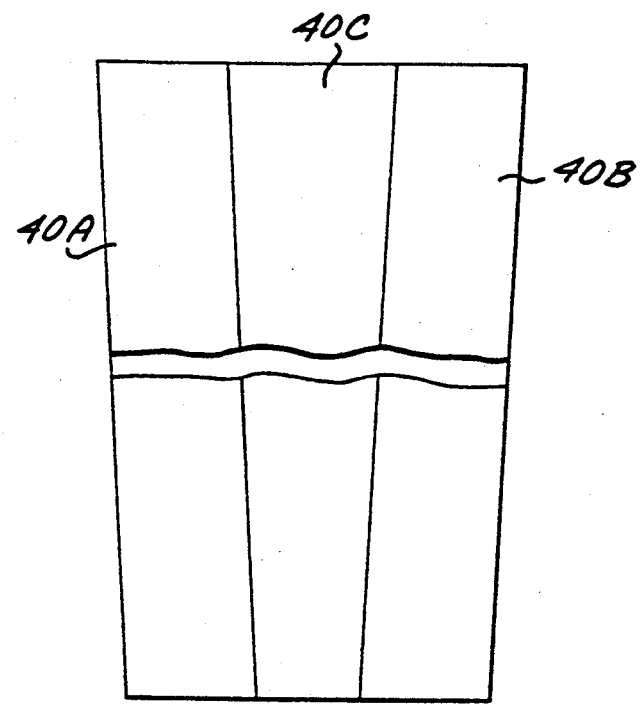
FIG. 5 is a cross-sectional view taken through a windshield having a tapered width dimension in accordance with the invention.

The wedged layer of PVB is sandwiched between two windshield singlets, and the entire assembly is laminated together in a conventional windshield autoclave, shown schematically in FIG. 4. The resulting windshield laminate is shown in FIG. 5, and comprises the windshield singlets 40A, 40B, and the wedges layer of PVB 40C. The wedge is shown in exaggerated form in FIG. 5.

Figure 6:
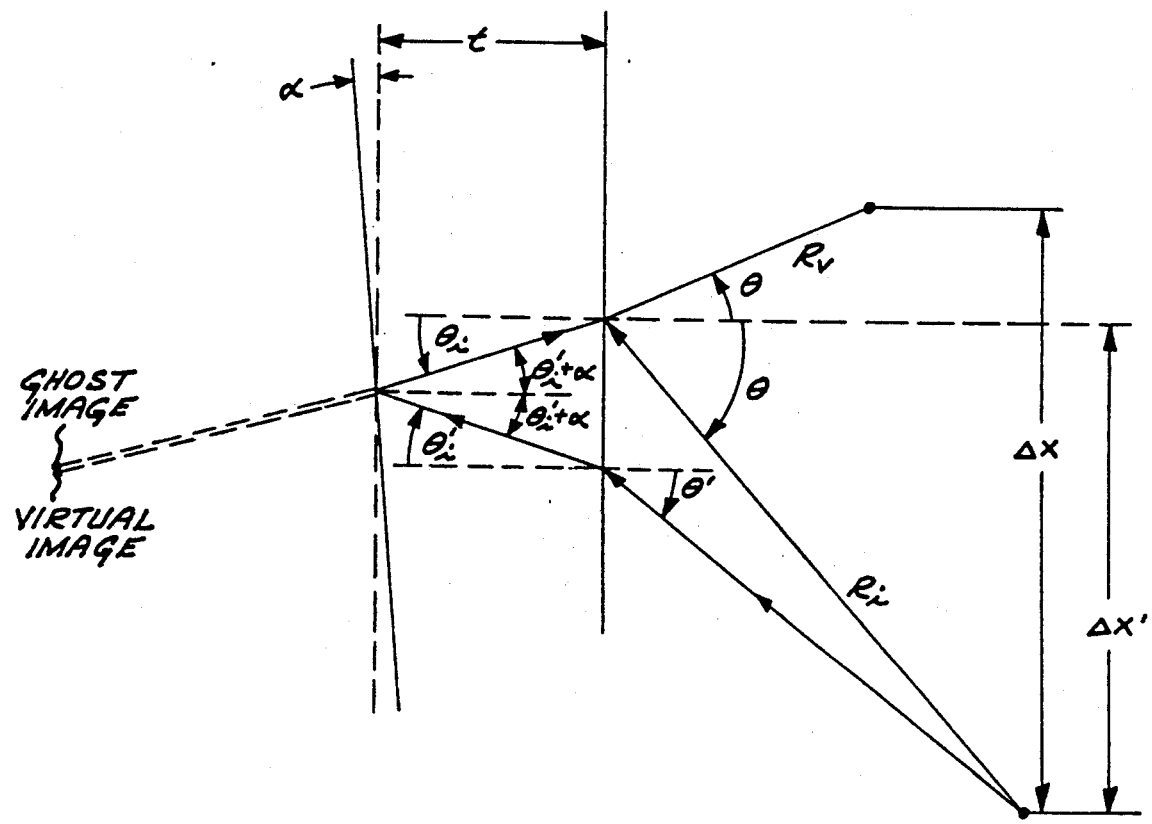
FIG. 6 is a cross-sectional view taken through a vehicle windshield in which the windshield has been wedged enough in accordance with the invention to cause the images to overlap.

When the windshield is laminated using the wedges PVB, as shown in FIG. 4, if the wedge is correctly selected for the HUD system, then the images reflected off surfaces 42 and 44 will exactly overlap and the ghost image problem will be eliminated, as shown in FIG. 6. For the parameter values discussed above with respect to FIG. 2, the required wedge angle to obtain overlapped images is 0.013°, representing a taper of 8 mils over 3 feet, i.e., the top of the windshield is 8 mils thicker than the bottom of the windshield.

The federal government sets a standard for optical see-through deviation which is defined in Section 5.15 of ANSl Z26.1—1983. This test requires that the optical deviation of the windshield laminate be no more than 0.43°. This in turn requires that the windshield wedge angle be no more 0.14°.

Figure 7:
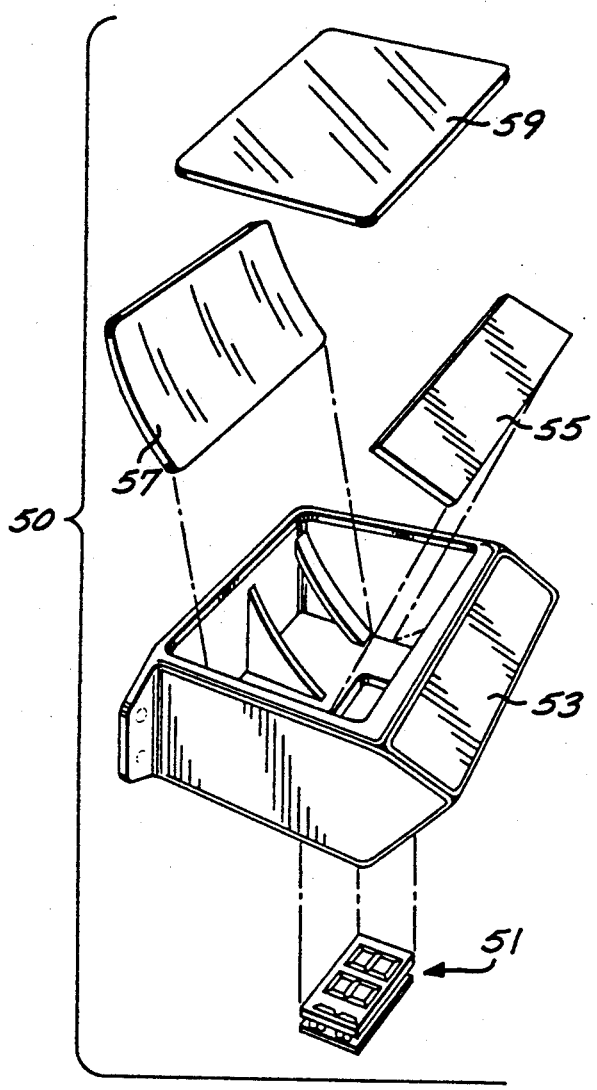
FIG. 7 is an exploded diagrammatic view illustrating the elements of a head-up display unit employed to project an image onto the vehicle windshield.

FIG. 7 is an exploded view of an exemplary head-up display unit 50 suitable for use in embodiments of the invention. The unit 50 comprises an image source and electronics 51 which generates the image light to be projected onto the windshield of the vehicle. Examples of image source include vacuum fluorescent display (VFDs), liquid crystal displays and light emitting diode displays. A structural housing 53 supports the unit elements. A flat mirror 55 reflects the image light from the source 51 onto the aspheric mirror 57, which in turn directs the light through the transparent cover 59 and onto the windshield. The curvature of the aspheric mirror 57 is selected to provide the desired apparent optical path length ($R_i$) from the image source to the windshield. Use of the aspheric mirror can provide a much longer apparent path length than the actual path length.

Head-up display units similar to unit 50 are described in the pending patent application entitled "Automotive Head-Up Display," M. Weihrauch et al., filed Apr. 7, 1989, as application Ser. No. 07/335,174, commonly assigned to the owner of the present patent application, now U.S. Pat. No. 4,973,139, the entire contents of which are incorporated herein by this reference.

Figure 8:
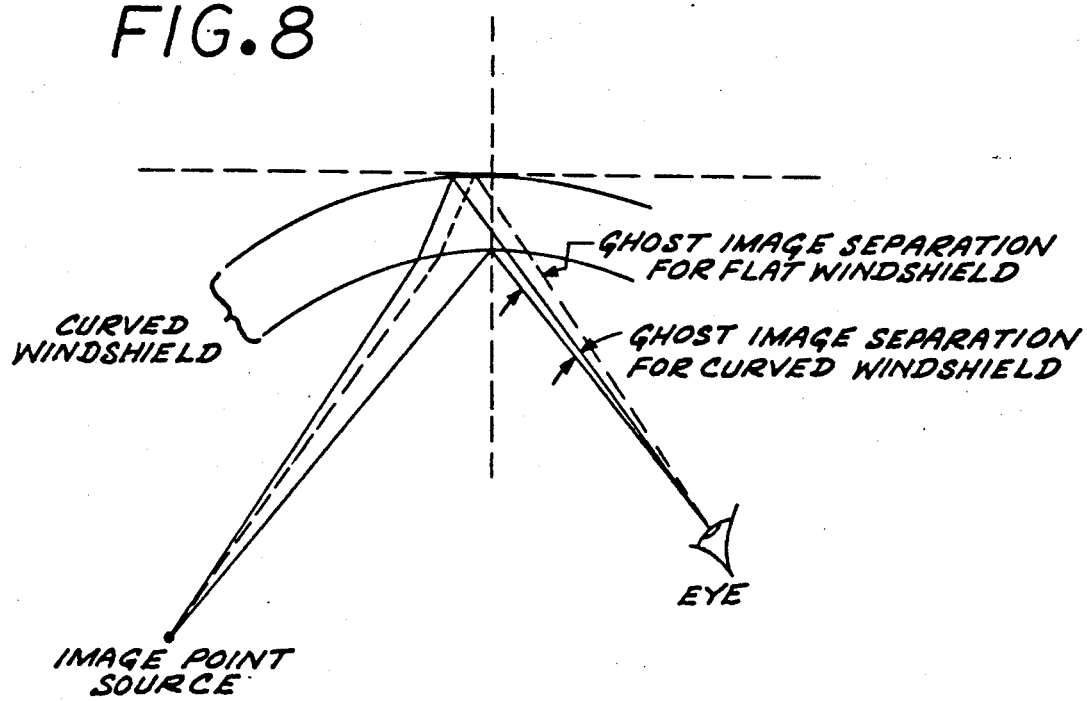
FIG. 8 is a diagrammatic cross-sectional view of a curved windshield illustrating the formation of ghost images, compared to a simple plane-parallel windshield.

The analysis of the ghost image problem has been described in connection with a plane-parallel plate windshield, i.e., a planar, flat windshield structure. Most automotive windshields are not simple planar, flat structures, but instead include curvature in the horizontal and vertical directions. The vertical curvature can reduce the ghost image separation, as illustrated in FIG. 8. However, use of a wedged, curved windshield in accordance with the invention provides further improvement, and results in substantial elimination of the ghost image. FIGS. 9A and 9B illustrate a model for a curved windshield which may be analyzed to determine the correct wedge to eliminate the ghost image separation. Thus, FIG. 9A shows a curved windshield of uniform thickness t, having an inner surface curvature radius of $R_c$ and an outer surface radius of $R_c+t$.

FIG. 9B shows a curved windshield wherein the exterior surface is tilted about an axial point P by an angle α. FIGS. 9B and FIG. 10 show the various parameters employed in the analysis used to determine the appropriate tilt angle to result in overlapping of the ghost image (reflected off the exterior windshield surface) with the main image (reflected off the interior windshield surface). That analysis results in the following set of equations which can be solved by known methods to result in the necessary tilt angle to obtain the desired overlapping of the ghost image.

"Real" Reflected Ray: $\Delta X=(R_i+R_v)\sin\theta$ (4)
"Ghost": $\Delta X=R_i\cos\theta\tan\theta_1'+R_v\cos\theta\tan\theta_2'+M$ (5)

$$\eta_1 = \sin^{-1}\frac{R_i\sin(\theta_1' - \theta)}{R_c\cos\theta} \quad (6)$$

$$\beta_1 = \sin^{-1}\frac{\sin(\theta_1' + \eta_1)}{n} - \eta_1 \quad (7)$$

$$\eta_2 = \tan^{-1}\frac{t\tan\beta_1 - R_c\sin\eta_1}{R_c + t} \quad (8)$$

$$\beta_2 = \beta_1 - 2\eta_2 - 2\alpha \quad (9)$$

$$M = t[\tan\beta_1 + \tan(\beta_1 - 2\eta_2)] \quad (10)$$

$$\eta_3 = \tan^{-1}\frac{M}{R_c} - \sin\eta_1 \quad (11)$$

$$\theta_2' = \sin^{-1}[n\sin(\beta_2 + \eta_3)] - \eta_3 \quad (12)$$

As will be apparent to those skilled in the art, solutions for the parameter values for a particular application may be obtained by setting up a ray trace model and using a computer ray trace program such as Code V, marketed by Optical Research Associates, 550 N. Rosemead Blvd., Pasadena, California 91107, to solve the mathematical problem.

Table I sets forth exemplary results of the solutions for various parameter values.

TABLE I

| t | $R_i$ | θ | $R_c$ | Δθ | α |
|---|---|---|---|---|---|
| .19" | 65" | 69° | 350" | .0459° | .00676° |
| .17 | 65" | 69° | 350° | .0411° | .00605° |
| .19 | 65" | 69° | 350° | .0459° | .00676° |
| .21 | 65" | 69° | 350° | .0508° | .00748° |
| .21 | 5" | 69° | 350° | .1796° | .1868° |
| .21 | 15" | 69° | 350° | .1418° | .0545° |
| .21 | 25" | 69° | 350° | .1133° | .0294° |
| .21 | 35" | 69° | 350° | .0909° | .01886° |
| .21 | 45" | 69° | 350° | .0730° | .01302° |
| .21 | 55" | 69° | 350° | .0582° | .00932° |
| .21 | 65" | 69° | 350° | .0459° | .00676° |
| .21 | 75" | 69° | 350° | .0354° | .00489° |
| .21 | 85" | 69° | 350° | .0264° | .00340° |
| .21 | 85" | 60° | 350° | .0653° | .01465° |
| .21 | 85" | 63° | 350° | .0601° | .01203° |
| .21 | 85" | 66° | 350° | .0536° | .00936° |
| .21 | 85" | 69° | 350° | .0459° | .00676° |
| .21 | 85" | 72° | 350° | .0367° | .00435° |
| .21 | 85" | 75° | 350° | .0254° | .00224° |
| .21 | 85" | 75° | 200" | .0142° | .00133° |
| .21 | 85" | 75° | 350" | .0459° | .00676° |
| .21 | 85" | 75° | 500" | .0530° | .00894° |
| .21 | 85" | 75° | 650" | .0561° | .01011° |
| .21 | 85" | 75° | 800" | .0578° | .01085° |
| .21 | 85" | 75° | ∞(0) | .0641° | .01403° |

These results indicate that the ghost image separation Δθ and the wedge angle α required to overlap the images both increases with increasing windshield thickness t, decreasing image source to windshield distance $R_i$, decreasing windshield vertical curvature 1/$R_c$, and decreasing incident angle θ in the region between 75° and 60°. Thus, the amount of ghost image separation and the amount of wedge required to overlap the images is highly dependent on the specific windshield and HUD parameters involved.

When viewing the HUD image reflected off of conventional windshields, there is some change in the separation of the two ghost images as the viewer moves his head around in the eyebox. This is most likely due to (1) slight non-uniformities in the PVB thickness and/or (2) variation in apparent virtual image position as one moves about the eyebox. These problems are likely to also exist for a windshield which has wedged PVB.

However, if the variation in separation between the ghost images is small, then the two images reflecting off the wedge windshield will remain substantially overlapped throughout the entire eyebox, resulting in an acceptable image.

The wedge windshield should experience none of the problems of see-through distortion, see-through discoloration, reflection distortion, low see-through transmission, deviation from the federal transmission specification, excessive transmission of infrared light, poor or excessive PVB adhesion, and inadequate reduction of ghost image. In addition, it does not involve any extra windshield components or windshield lamination steps, only the replacement of a uniform-thickness PVB sheet with a wedged PVB sheet. Therefore, once a machine for extruding wedges PVB is obtained, there would be no additional cost involved.

For the conventional reflective HUD unit 50 shown in FIG. 1, which uses a vacuum fluorescent display (VFD), there is some concern about the brightness of the image arriving at the eye. The current VFD's may provide only 3000 fl. The brightness of the main and ghost images at the viewer is found by multiplying 3000 fl by the 90% reflectance off each of the two HUD mirrors comprising the HUD unit 50, equalling about 2400 fl, then multiplying by the reflectance off the front surface of the windshield for the main image, and multiplying by the reflectance off the rear surface for the ghost image. Using a conventional windshield in combination with the HUD unit 50 does not yield a sufficiently bright image; the image contrast (the ratio of the image brightness to background brightness) is too low during sunlit ambient conditions to be acceptably visible. However, the wedged windshield causes the two images to overlap, resulting in nearly 40% more image brightness than the brighter of the two individual images.

Even if the image contrast using a VFD is not high enough for a particular application, there are alternate image sources such as certain liquid crystal displays and light emitting diode (LED) displays which can deliver enough brightness to yield an acceptable image for that application.

It will be appreciated that the invention is not limited to the particular technique for fabricating a wedge windshield as described above. For example, the wedge could be formed in the intermediate layer by passing a planar layer of PVB (or other suitable material such as urethane) though a wedge set of rollers. Another alternative is to shave off a sufficient portion of the intermediate layer so that the remaining layer is wedged.

It is understood that the above-described embodiments are merely illustrative of the possible specific embodiments which may incorporate principles of the present invention. Other arrangements may readily be devised in accordance with these principles by those skilled in the art without departing from the scope of the invention. For example, the invention is not limited to use with a vehicle-mounted, head-up display, and may be used with any head-up display which projects the image onto an optical combiner element, such as airport control tower applications and the like. A vehicle windshield is, of course, one type of optical combiner.

What is claimed is:

1. A head-up display including a transparent optical combiner, comprising:

a head-up display image projection unit for projecting a beam of image light toward the optical combiner for reflection toward a predetermined view box; and wherein said optical combiner comprises a first surface and a second surface, wherein said surfaces are nonparallel and disposed at respective first and second angles with respect to the image beam so that the respective images reflected from the first and second surfaces substantially overlap at the view box, wherein said optical combiner comprises first and second optical members sandwiching an intermediate layer of transparent material, and wherein said intermediate layer is characterized by a taper in its thickness dimension from adjacent a first edge of the combiner to adjacent a second edge of the combiner, such that the layer thickness is greater adjacent the first edge than the second edge;

whereby a substantially ghost-free head-up display image is provided at the view box.

2. The head-up display of claim 1 wherein said transparent material comprises polyvinylbutyral.

3. The head-up display of claim 1 wherein said first and second surfaces are each flat planar surfaces, so that the optical combiner is substantially flat.

4. The head-up display of claim 1 wherein said first and second surfaces are each curved, so that the optical combiner comprises one or more curves.

5. The head-up display of claim 1 wherein said image projection unit and said optical combiner are adapted and arranged such that a first edge of the combiner is about 8 mils thicker than a second edge of the combiner, whereby a substantially ghost free head-up image is provided at the view box.

6. A head-up display for a vehicle having a transparent windshield, comprising:

a head-up display image projection unit for projecting a beam of image light toward the vehicle windshield for reflection toward a predetermined view box;

said windshield comprising a first surface and a second surface, wherein said surfaces are nonparallel and disposed at respective first and second angles with respect to the image beam so that the respective images reflected from the first and second surfaces substantially overlap at the view box, wherein said windshield comprises first and second windshield singlets sandwiching an intermediate layer of transparent material, and wherein said intermediate layer is characterized by a taper in its thickness dimension from adjacent the top of the windshield to adjacent the bottom, such that the layer thickness is greater adjacent the top than the bottom;

whereby a substantially ghost-free head-up display image is provided at the view box.

7. The head-up display of claim 7 wherein said transparent material comprises polyvinylbutyral.

8. The head-up display of claim 6 wherein said first and second surfaces are each flat planar surfaces, so that the windshield is substantially flat.

9. The head-up display of claim 6 wherein said first and second surfaces are each curved, so that the windshield comprises one or more curves.

10. The head-up display of claim 6 wherein said image projection unit and said windshield are adapted and arranged such that the top of the windshield is about 14 mils thicker than the bottom of the windshield, whereby a substantially ghost free head-up image is provided at the view box.

11. A wedged vehicle windshield for use in combination with a head-up display unit which projects a beam of image light toward the windshield for reflection toward a predetermined view box, the windshield having a first surface and a second surface, and characterized in that said surfaces are non-parallel and disposed at respective first and second angles with respect to the image beam so that the respective images reflected from the first and second surfaces substantially overlap at the view box, wherein said windshield includes first and second windshield singlets sandwiching an intermediate layer of transparent material, and wherein said transparent material is characterized by a taper in its thickness dimension from adjacent the top of the windshield to adjacent the bottom, such that the layer thickness is greater adjacent the top than the bottom of the windshield.

12. The wedged vehicle windshield of claim 11 further characterized in that the windshield includes first and second windshield singlets sandwiching an intermediate layer of transparent material, and wherein said transparent material is characterized by a taper in its thickness dimension from adjacent the top of the windshield to adjacent the bottom, such that the layer thickness is greater adjacent the top than the bottom of the windshield.

13. The wedged vehicle windshield of claim 11 wherein said transparent material comprises polyvinylbutyral.

14. The wedged vehicle windshield of claim 11 wherein said first and second surfaces are each flat planar surfaces, so that the windshield is substantially flat.

15. The wedged vehicle windshield of claim 11 wherein said first and second surfaces are each curved so that the windshield comprises one or more curves.

16. The wedged vehicle windshield of claim 11 further characterized in that the the top of said windshield is about 20 mils thicker than the bottom of the windshield, whereby a substantially ghost free head-up image is provided.

* * * * *